United States Patent [19]

Pettersson et al.

[11] 4,095,913

[45] Jun. 20, 1978

[54] TONGUE AND GROOVE JOINT

[76] Inventors: Nils Ingvar Pettersson, Bruksvagen 31, 752 41 Uppsala; Olle Gideon Carlsson, Brillingevägen 3, 754 45 Uppsala, both of Sweden

[21] Appl. No.: 729,998

[22] Filed: Oct. 6, 1976

[30] Foreign Application Priority Data

Jun. 11, 1976 Norway ............................ 762032
Jun. 14, 1976 Germany .......................... 2626530
Jun. 14, 1976 United Kingdom ............. 24613/76

[51] Int. Cl.² ............................................ B25G 3/02
[52] U.S. Cl. .......................... 403/364; 52/593; 403/248
[58] Field of Search ............. 403/277, 282, 283, 345, 403/296, 364, 32, 248; 52/593, 595, 573, 514, 98; 285/DIG. 26

[56] References Cited

U.S. PATENT DOCUMENTS

| 1,018,828 | 2/1912 | Johnson | 403/345 |
| 1,163,784 | 12/1915 | Skinner | 403/345 X |
| 1,785,499 | 12/1930 | Sayers | 52/437 X |
| 1,989,955 | 2/1935 | Van Patter | 403/377 X |
| 2,981,669 | 4/1961 | Brand et al. | 403/282 X |
| 3,079,730 | 3/1963 | Donegan | 52/595 X |
| 3,482,865 | 12/1969 | Haller | 403/282 |
| 3,998,024 | 12/1976 | Frandsen | 52/595 |

*Primary Examiner*—Wayne L. Shedd
*Attorney, Agent, or Firm*—Witherspoon, Lane & Hargest

[57] ABSTRACT

In a tongue and groove joints the base of the groove is provided with one or more protuberances to space the tongue from the base of the groove. If the members forming the joint are such that they swell when moist the protuberances are made to be deformable to permit the members to swell without deforming the structure made from the members.

5 Claims, 6 Drawing Figures (PRIOR ART)

TONGUE AND GROOVE JOINT

FIELD OF THE INVENTION.

The present invention relates to a tongue and groove joint, and more particularly to a tongue and groove joint between planks, boards, panels or the like.

BACKGROUND OF THE INVENTION.

A tongue and groove joint between adjacent planks boards or panels is well known, and at the present time the use of planks provided with tongues and grooves on opposed side edges thereof is common in the formation of floors for houses or other such buildings. In laying such a floor the tongue provided on one side edge of one plank is inserted into a corresponding groove provided on one side edge of an adjacent plank, and the tongue and groove are of substantially the same size so that when the tongue and the groove have been interconnected the two planks are substantially rigidly interconnected and also the joint between the planks is substantially draught-proof.

Tongue and groove joints are also utilised in many other applications, and are utilised in connection with planks made of wood, panels or boards made of chipboard or other such materials, and even with larger panels, such as panels formed of concrete or the like.

Planks boards and panels made of wood, chipboard or the like tend to expand when they are wet, or when used in a moist atmosphere. When planks boards or panels interconnected by means of tongue and groove joints are utilised in damp conditions, the planks or boards expand and, for example, in the case of floor, the planks may become distorted and may move from their original position so that the floor is no longer planar. Similar distortions occur in other structures formed from panels or boards having tongue and groove connections, particularly items such as garage doors. More particularly this has been found to be a particular problem in connection with garage doors or tongue and groove panels or the exterior of a house where, of course, the planks panels or boards are frequently subjected to conditions of high humidity.

OBJECT OF THE INVENTION.

The present invention seeks to provide a tongue and groove connection in which the above described disadvantages are obviated or reduced, and the invention relates to a member provided with a groove adapted to receive a tongue, and also the invention relates to a member provided with a groove adapted to receive a tongue, and also provided with a tongue adapted to be received within a groove of a corresponding such member.

Another object of the invention is to provide a tongue and groove joint which can absorb expansion of the boards panels or planks constituting the joint.

SUMMARY OF THE INVENTION.

According to one aspect of this invention there is provided a member adapted to be connected to another member by means of a tongue and groove joint, said member being provided with a groove, said groove being provided with a spacer member therein adjacent the base thereof, said spacer member being adapted to space a tongue from the base of said groove.

According to another aspect of this invention there is provided a member adapted to form a tongue and groove joint with another member, said member being provided, on one edge thereof, with a groove, said groove being provided with a spacer member in the form of one or more protuberances extending inwardly from the base of said groove, said protuberances being formed integrally with the material forming the member.

It will be appreciated that by utilising the invention a predetermined spacing is achieved between adjacent members, thus permitting some subsequent expansion of the members. During such expansion the spacer member will be deformed or compressed.

BRIEF DESCRIPTION OF DRAWINGS.

In order that the invention may be more readily understood, and so that further features thereof may be appreciated the invention will now be described by way of example with reference to the accompanying drawings in which:-

DESCRIPTION OF PRIOR ART AND THE INVENTION.

Figure 1:
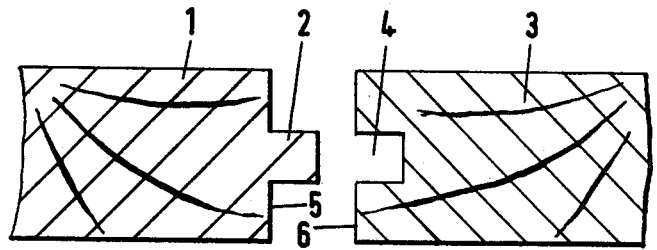
FIG. 1 is a sectional view of two prior proposed planks, one provided with a tongue, and one provided with a groove.
Figure 2:
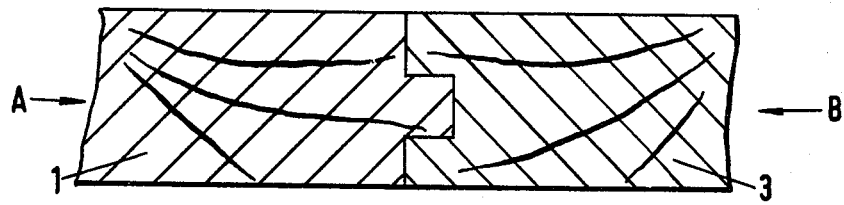
FIG. 2 is a sectional view of the two planks illustrated in FIG. 1 interconnected to form a tongue and groove joint.

Referring now to FIG. 1 in a tongue and groove joint as presently utilised, a board or panel of wood 1 is provided with a rectangular section tongue 2 on one side edge 5 thereof. A second board or panel 3 is provided with a rectangular groove 4 on the side edge 6 thereof facing the tongue 2. The tongue 2 and the groove 4 are of substantially the same size and thus when the boards or panels 1 and 3 are connected to form a tongue and groove joint, as illustrated in FIG. 2, the side wall 5 of the board 1 carrying the tongue 2 engages with the side wall 6 of the board 3 provided with the groove 4. Also the tip of tongue 2 engages with the base of the groove 4. When such boards or panels are subjected to moisture the boards or panels tend to expand in the direction of the arrows A and B of FIG. 2. Since the boards or panels are substantially rigidly interconnected by the tongue and groove connection there is no "give" and consequently the boards or panels tend to buckle or bow.

Figure 3:
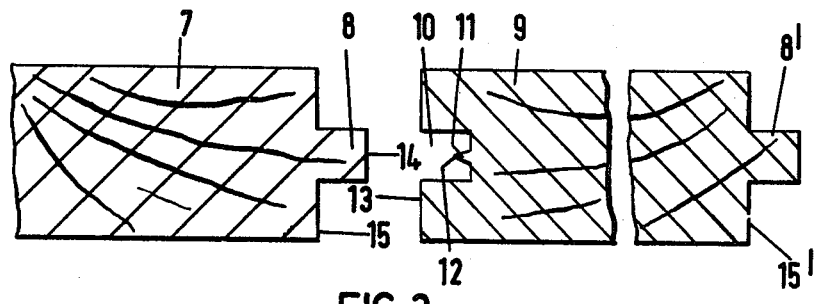
FIG. 3 is a sectional view of two members adapted to form a tongue and groove joint in accordance with the present invention.

FIG. 3 illustrates one embodiment of the present invention. A plank, board or panel 7 is provided with a rectangular tongue 8, this tongue corresponding precisely with the tongue 2 of the prior art. A second plank, board or panel 9 is provided with a generally rectangular groove 10 in one side wall 13 thereof, and the groove 10 is provided with a protuberance 11 which extends inwardly from the base of the groove 10. The protuberance 11 is formed integrally of the material forming the plank, board or panel, and the groove and protuberance may be formed in one operation by using an appropriate routing tool. The second plank board or panel 9 is provided with a tongue 8' on the side face thereof 15' remote from the groove 10.

In the particularly described and illustrated embodiment the protuberance 11 is of triangular section and is situated symmetrically on the base of the groove.

The distance between the tip 12 of the protuberance 11 and the face 13 of the plank board or panel 9 is less than the distance between the tip 14 of the tongue 8 and the face 15 of the plank board or panel 7.

Figure 4:
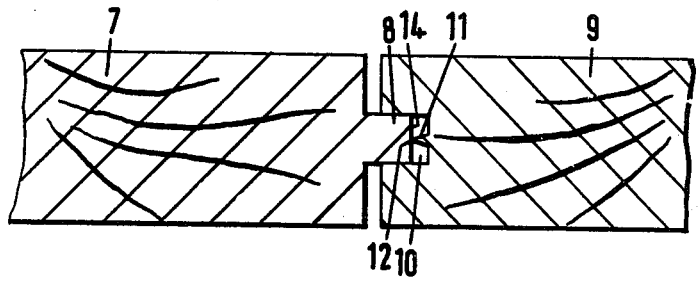
FIG. 4 is a sectional view of the two members illustrated in FIG. 3 when assembled to form a tongue and groove joint.
Figure 5:
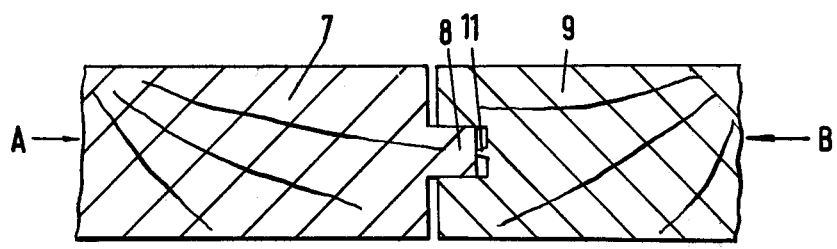
FIG. 5 is a sectional view of the two members forming the tongue and groove joint as illustrated in FIG. 4 after the members have been subjected to moisture.

When the planks boards or panel 7 and 9 are assembled to form a tongue and groove joint, as illustrated in FIG. 4, of the accompanying drawings, the tip 12 of the protuberance 11 engages with the end face 14 of the tongue 8, and thus the tongue 8 is not wholly introduced to the groove 10. However, a substantially draught-proof and substantially rigid connection between the boards 7 and 9 is obtained. The face 13 of the plank board or panel 9 does not contact the face 15 of the plank board or panel 7. When the panels or boards 7 and 9 are subjected to moisture the boards or panels expand and forces are generated as indicated by the arrows A and B shown in FIG. 5. The protuberance 11 is formed so that it is relatively weak, compared with the overall strength of the tongue 8, this being because the protuberance 11, at the tip thereof, has less thickness than the overall thickness of the tongue 8. Thus the end portion or tip of the protuberance 11 collapses as a result of the forces applied to the protuberance by the tongue 8, and thus the boards or panels 7 and 9 are permitted to expand slightly, thus preventing planks boards or panels from becoming bowed. This relative movement of the planks boards or panels may continue until the faces 13 and 15 come into contact, or until the protuberance 11 will not provide any more "give".

Figure 6:
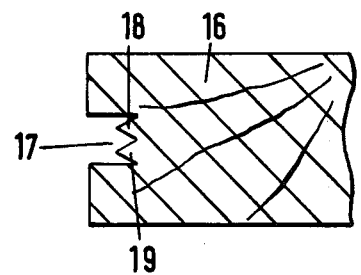
FIG. 6 is a sectional view of part of a further member showing a second form of groove.

FIG. 6 illustrates a further embodiment of the invention in which a plank board or panel 16 is provided with a groove 17, there being two substantially triangular protuberances 18, 19 provided on the base of the groove 17, the protuberances being symmetrically arranged and being each of generally triangular cross-section.

Whilst the invention has been described with reference to substantially triangular protuberances provided on the base of the groove, it is to be noted that the protuberances may be of any shape or form and may be provided at any convenient place within the groove. The protuberance or protuberances act as spacer members, and act to space the tongue from the base of the groove. The protuberance or protuberances are preferably of a compressible or deformable nature and thus provide some "give" to prevent the planks boards or panels from becoming distorted in damp or moist conditions.

The planks panels or boards illustrated in the accompanying drawings may comprise wood, chipboard, fibreboard or any other such material.

It is also to be appreciated that the invention may also be applied to members of concrete or the like, where it is desired to obtain a predetermined spacing between adjacent members.

I claim:

1. A first member adapted to form a tongue and groove joint with a second member, said first member being provided, with means defining a groove on one edge thereof said groove having two parallel sides and a base transverse thereto, said groove being provided with a spacer member in the form of a protuberance extending into said groove from its base, said protuberance being formed integrally with the material forming the member, said second member being provided on an edge thereof opposed to said edge provided with said groove, with a tongue, said protuberance being adapted to space said tongue from said base of said groove, wherein the distance between the innermost part of said protuberance and said edge in which said groove is formed is less than the distance between the tip of said tongue and said edge on which said tongue is formed.

2. A member as claimed in claim 1 wherein the said protuberance is of triangular section.

3. A member as claimed in claim 1 wherein said protuberance is compressible.

4. A member as claimed in claim 1 wherein said protuberance is deformable.

5. A member as claimed in claim 1 wherein said protuberance is located symetrically on said base of said groove.

* * * * *